United States Patent [19]

Antonetti et al.

[11] 3,774,677

[45] Nov. 27, 1973

[54] COOLING SYSTEM PROVIDING SPRAY TYPE CONDENSATION

[75] Inventors: Vincent W. Antonetti; Omkarnath R. Gupta, both of Poughkeepsie; Kevin P. Moran, Wappingers Falls, all of N.Y.

[73] Assignee: International Business Machines Corporation, Armonk, N.Y.

[22] Filed: Feb. 26, 1971

[21] Appl. No.: 119,323

[52] U.S. Cl. .................................... 165/39, 165/50
[51] Int. Cl. .............................................. B60h 1/00
[58] Field of Search ................................ 165/39, 50

[56] References Cited

UNITED STATES PATENTS 3,512,582 5/1970 Chu et al. .......................... 165/105

*Primary Examiner*—Charles Sukalo
*Attorney*—Hanifin & Jancin and Harold H. Sweeney, Jr.

[57] ABSTRACT

A spray condensing and cooling arrangement is provided in a liquid cooling system to provide condensing of vapors generated by nucleate boiling at a heat source. Two-phase flow takes place from the heat source in the form of liquid and boiling vapors to said spray condensing and cooling means where the vapors are condensed by the cooler spray in the spray condensing and cooling means. The amount of spray and, accordingly, the amount of vapor condensation is controlled by a servo arrangement which regulates the pressure within the system.

9 Claims, 2 Drawing Figures

INVENTORS
VINCENT W. ANTONETTI
OMKARNATH R. GUPTA
KEVIN P. MORAN

BY Harold H Sweeney Jr.
ATTORNEY

COOLING SYSTEM PROVIDING SPRAY TYPE CONDENSATION

This invention relates to a liquid cooling system and more particularly, to a liquid cooling system having a spray type condenser for condensing liquid vapors and controlling the pressure within the system.

As further techniques for miniaturizing electronic components have been developed, one of the size limiting factors has been the cooling. As the components are reduced in size, the area from which the heat can be dissipated has likewise been reduced. Accordingly, new techniques for cooling these miniaturized components have become necessary. Recently, immersion type cooling systems have been investigated wherein the array of components to be cooled is immersed in a tank of cooling liquid. The liquids used are the new dielectric fluorocarbon liquids which have a low boiling point. These liquids give rise to various modes of cooling at relatively low temperatures. The mode of cooling, and consequently the heat transfer, is dependent on the heat flux at the surface interface between the components to be cooled and the cooling liquids. For a heat flux which produces a temperature below the boiling point of the liquid, convection takes place. As the heat flux increases the temperature beyond the boiling point of the liquid, nucleate boiling takes place. The nucleate boiling causes the vaporization of the liquid immediately adjacent the hot component. As the vapor bubbles form and grow on the heated surface, they cause intense micro-convection currents. Thus, nucleate boiling gives rise to an increase in convection cooling within the liquid, and accordingly, improves the heat transfer between the hot surface and the liquid. As the heat flux increases, the nucleate boiling increases to the point where the bubbles begin to coalesce and heat transfer by vaporization predominates. Heat transfer by nucleate boiling has proven to be very efficient. However, there are problems in designing cooling systems using nucleate boiling which are efficient and practical for high power electronic components which, accordingly, generate large amounts of heat.

In copending U. S. patent application, Ser. No. 887,080, filed Dec. 22, 1969 now U.S. Pat. No. 3,586,101 , a cooling system for data processing equipment is disclosed in which a plurality of electronic component modules to be cooled are located in chambers which have a cooling liquid circulating therethrough by gravity feed from a buffer storage reservoir located at the top of the cooling system. A phase-separation column is provided which is connected to the output of each of the module chambers by equal length conduits. The components within the modules give rise to nucleate boiling within the cooling liquid. The vapor bubbles and the cooling liquid pass through the conduit and into the phase-separation column where the vapor bubbles rise and the liquid drops. A condenser is located above the phase-separation column for condensing vapor bubbles. For very high power operation of the electronic components, a considerable amount of vapor is produced which is beyond the handling capacity of the condenser. One means of improving the amount of consensing which takes place is to increase the surface area on which the condensation forms. This is often times impractical from a packaging viewpoint. Another problem encountered with high power electronic modules which generate a great deal of vapor is that the vapor pressure builds up within the system if the condenser is not capable of providing the required increase in condensation. This produces a back pressure on the electronic component boards which is harmful and which also tends to change the boiling point of the liquid in the system. The opposite effect is possibie, that is, the condenser being of sufficient surface area and temperature of cause full condensation of all the vapors as they are generated, thus producing a negative pressure in the system.

Accordingly, it is the main object of the present invention to provide a cooling system having a spray condenser for handling the large amount of vapors generated in data processing equipment.

It is another object of the present invention to provide a spray condensing and cooling system which effectively eliminates back pressures at the components to be cooled.

It is a further object of the present invention to provide a liquid cooling system using a spray condenser by means of which the pressure within the system can be closely controlled.

It is another object of the present invention to provide a liquid cooling system using a spray type condenser in which the pressure is used to regulate the control of the system.

It is a further object of the present invention to provide a liquid cooling system using a spray condensing technique in which the temperature of the liquid within the system downstream of the spray condenser is utilized as the control input for regulating the condensing within the system.

It is another object of the present invention to provide a liquid cooling system using a spray condenser which reduces the number of liquid interfaces used in the system and, thus, reduces the possibility of cooling liquid contamination.

Briefly, the invention comprises an improved liquid cooling system for data processing equipment and the like in which the heat source is immersed in the cooling liquid so that nucleate boiling takes place within the liquid to remove the heat from the source. The nucleate boiling sets up a two-phase flow in the form of vapor and liquid which carries the heat from the heat source to a spray condensing and cooling means. The vapors in the two-phase flow being condensed and cooled by the cooler spray in the spray condensing and cooling means. The amount of spray and consequently the amount of condensation is controlled within the system by monitoring the pressure or temperature within the system and, accordingly, controlling the amount of the cooling liquid fed to the spray condenser to produce the condensation.

The foregoing and other objects, features and advantages of the invention will be apparent from the following more particular description of a preferred embodiment of the invention, as illustrated in the accompanying drawings.

Figure 1:
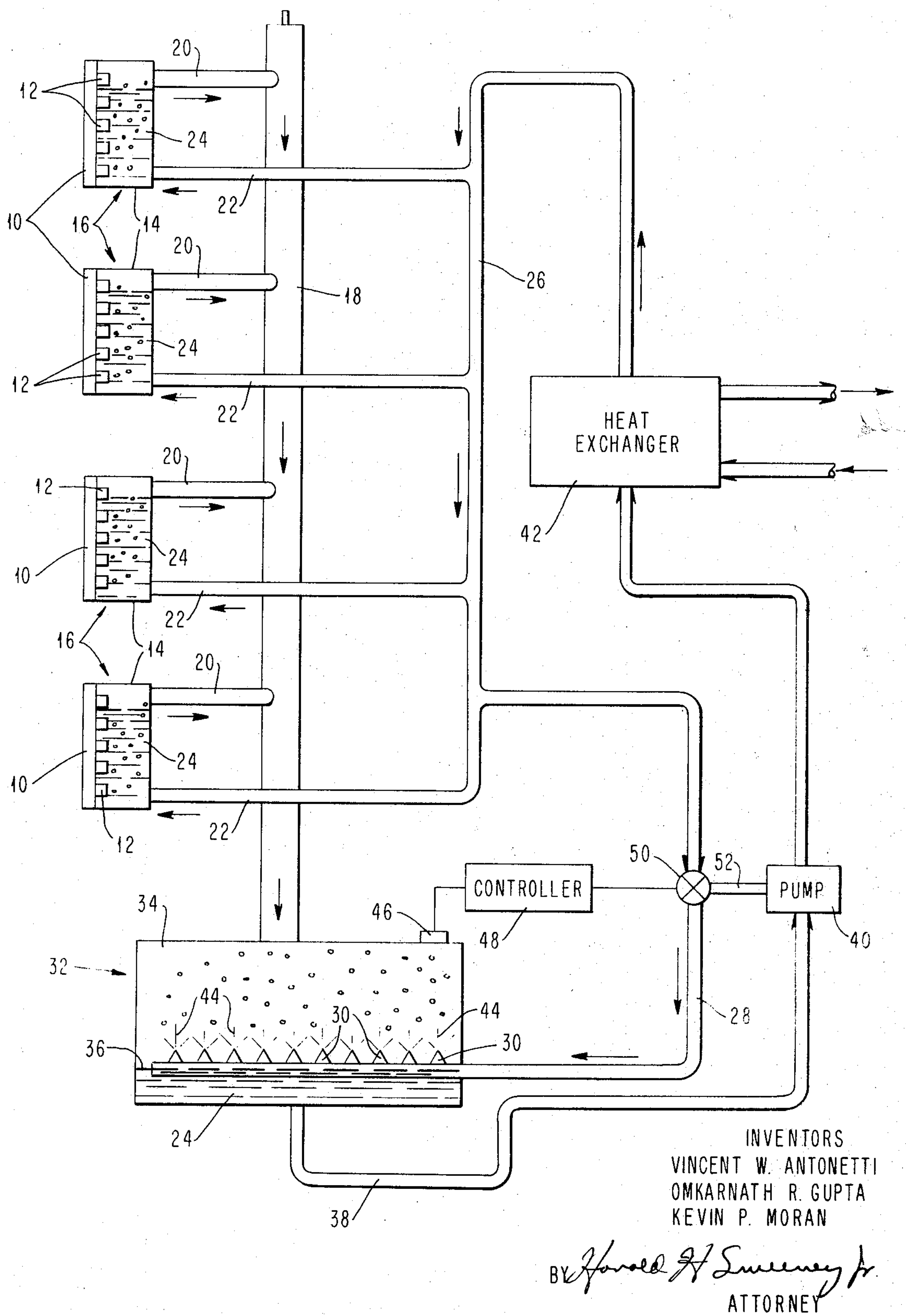
FIG. 1 is a schematic diagram of a cooling system having a spray condenser and an automatic control.

Referring to FIG. 1, there is shown a number of circuit boards 10 having electronic heat generating components 12 mounted thereon. The electronic components taken collectively form the heat source to be cooled by the system. The boards 10, either individually or in a group, have a chamber 14 connected thereto forming a module 16. The modules 16 are connected near the top thereof to a two-phase manifold 18 via a conduit 20. An input conduit 22 is connected to the chamber 14 near the bottom of each of the modules 16 by means of which the cooling liquid 24 is supplied to the modules 16. The liquid 24 is fed to the modules from a quench supply line 26 which not only connects to each of the modules 16 but is connected via a conduit 28 to the spray nozzles 30 within the spray condenser 32.

The spray condenser 32 consists of a closed vessel or chamber 34 having a number of spray nozzles 30 located therein at a level above the surface level 36 of the coolant liquid 24. The condensing chamber 34 is connected at the top thereof to the bottom end of the two-phase manifold 18 so that the two-phase flow from each of the modules 16 is fed thereto. A pump return line 38 is provided connected to the bottom of the spray condenser chamber 34 and connected at the other end thereof to the circulating pump 40 of the system. The pump 40 causes the cooling liquid 24 to circulate from the bottom of the spray condenser chamber 34 to a heat exchanger 42 where the liquid is subcooled and then to circulate to the electronic component modules 16 through the quench supply line 26 and the separate module input conduits 22. The liquid circulates through the modules 16 and passes out conduits 20 into the two-phase manifold 18 which connects into the top of the spray condenser 32. The heat exchanger can be of the fin and tube type where cool water is circulated through the tubing to pick up the heat from the fins which are immersed in the hot coolant liquid being circulated.

In operation, the electronic components 12 in the modules 16 generate heat which, when sufficiently high, cause the nucleate boiling in the liquid 24. The liquid 24 is of the fluorocarbon type which has a low boiling point. Nucleate or boiling bubbles are formed which rise and are carried by the circulating liquid out of the output conduit 20 near the top of the modules 16 to the two-phase manifold 18. The two-phase flow, that is, the vapor in the form of boiling bubbles and the carrying liquids, drop down the two-phase manifold 18 where the liquid 24 drops to the bottom of the spray condensing chamber 34. The spray 44 from the nozzles 30 causes the vapors to condense and the resulting liquid also drops to the bottom of the chamber 34. The coolant liquid 24 in the spray condensing chamber 34 does not rise above the height of the spray nozzles 30. The pump return conduit 38 carries the excess cooling liquid 24, which is now relatively hot, to the pump 40 where the pump continues to cause circulation of the fluid. The heat is removed from the circulating liquid 24 at the heat exchanger 42 and the subcooled liquid, that is, the liquid cooled below its boiling point is supplied again to the modules 16 and to the spray nozzles 30 for continuous operation of the system. It will be appreciated, that the same liquid that is supplied to the modules 16 in the cooled state is also supplied to the spray nozzles 30. The subcooled liquid can be used as the condensing liquid since the liquid, after it is passed through the modules, is heated by the electronic components into its two-phase state and, thus, the spray is much cooler in comparison to the hot vapor.

The direct spray condenser 32 operation is essentially a mixing process which can be anticipated from the first law of thermodynamics, that is, the heat input must equal the heat output. Therefore, the heat output of the system following the spray condenser 32 is a result of the mixing of the heat input from the two-phase flow and the heat input from the cool quench flow. It will be appreciated, that practically any desired exit temperature or output temperature can be obtained depending upon the amount of quench flow provided. This assumes, of course, that there is sufficient heat transfer surface available for the heat transfer from the two-phase fluid to the quench liquid to take place. If the condensation is not sufficient, that is, the vapor portion of the two-phase fluid is not condensing sufficiently fast in comparison to the generation of the vapor, the result will be an accumulation of vapor and an increase in the system pressure. Thus, increased quench flow in the form of a spray supplies the additional surface area necessary to cause the condensation of the vapors in the two-phase fluid. Accordingly, the nozzle 30 openings must be selected to provide a spray 44 which will give sufficient heat transfer surface to transfer heat at the desired rate while maintaining the back pressure in the two-phase manifold 18 and modules 16 below a predetermined value. In other words, the nozzles 30 atomize the quench liquid thereby producing a tremendous amount of heat transfer surface area per unit of time allowing the heat to be transferred within the given limited volume of the direct spray condenser 32.

The cold quench liquid, that is, the sub-cooled liquid 24 fed to the spray condenser via conduit 28, is atomized or formed into droplets of various sizes by the nozzles 30. The diameters of the droplets follow a normal distribution. Assuming that all the droplets are of an average size, the following analysis can be made.

The droplet surface area per pound of dielectric can be found as follows:

$$A_s = 36/pr \ (\mathrm{Ft}^2/\mathrm{lb.}) \qquad (1)$$

where:

$A_s$ = Surface area of drops per pound of liquid
$p$ = Density of the liquid (lbs/Ft³)
$r$ = Radius of droplet (inches)

The above equation (1) indicates that the surface area (per pound of liquid) can be increased indefinitely by reducing the droplet radius. However, we will see below that the drop size cannot be reduced indefinitely because the effective vapor pressure of the droplet will increase as the radius decreases causing, in the extreme, the droplets to evaporate.

The vapor pressure at the droplet surface can be seen from:

$$P = P_{-} \exp (2\sigma M/RTpr)$$
$$= P_{-} \exp (2.3 \times 10^{-4})/r \qquad (2)$$

where:

P = Vapor pressure at a droplet surface of radius "$r$"
$P_{-}$ = Vapor pressure at $T_{sat}$ for a flat liquid surface
$\sigma$ = Surface tension
M = Molecular weight of liquid
R = Gas Constant T = Liquid temperature in Kelvin The heat capacity of the droplet and the droplet life must be taken into consideration. As the radius decreases, the heat capacity of the droplet decreases and the surface area to droplet heat capacity ratio increases. Thus, as the droplet size decreases, the condensation thermal resistance and the time constant decrease. Therefore, the droplet size must be chosen properly, so that it will exist as long as it is reasonably subcooled. The droplet life depends on the initial velocity of the droplet, the radius of the droplet, (drag force) and finally, the available distance for the droplet to travel. This is quite a complex situation but it can be simply stated that droplet life is proportional to the distance travelled and inversely proportional to the initial velocity.

$$\text{Droplet life} = \text{Distance/Velocity} \qquad (3)$$

The required weight ($w$) of the suspended droplet at any instant in time per kilowatt (K.W.) of power generated at the board may be expressed as:

$$W = K_1 \; [r/h \; T]$$

where:

$h$ = condensation heat transfer coefficient

T = temperature difference between the saturation temperature of the vapor and the inlet temperature of the liquid droplet (°F.)

$K_1$ = Derived constant from equations (1) and (3)

Equation (4) can be used in conjunction with equation (1) to predict the quench flow rate required from a heat transfer point of view. This flow rate must be at least equal to that derived from the first law of thermodynamics.

The fact that the same system coolant liquid 24 is used as the quench liquid in the direct spray condenser 32 has several advantages. It is not necessary to bring in cooling water from another source to a standard fin type condenser, which would produce another water to cooling-liquid interface, which in the case of a leak would serve to introduce a water contaminant. Also, the problem of ambient air entering the system and condensing is reduced. The direct spray condensing process within the system requires higher dielectric liquid flow rates than is required in the prior boiling liquid systems, as in copending U. S. patent application, Ser. No. 887,080, filed Dec. 22, 1969, now U.S. Pat. No. 3,586,101 previously referred to. Another factor which should be taken in consideration is that the direct spray condensing arrangement results in less complex and less expensive thermal system per unit heat load than the prior art system. It is also estimated that the direct spray condensing system should be lighter and should require less volume than systems utilizing the standard fin type condenser.

As the power applied to the electronic equipment being cooled within the system is increased, the heat flux will increase with a consequent increase in vapor generation within the cooling system. Accordingly, the pressure within the system will increase, unless the condensing is increased. The opposite would also happen when the condensation is essentially in excess of that necessary to maintain a fixed pressure. This will generate essentially a negative gage pressure. Therefore, it is essential to maintain a quasi-equilibrium condition by matching the rate of condensation to the rate of vapor generation. The negative pressure within the condensing chamber 34 (and therefore within the cooling system) will result in cavitation in the primary coolant supply pump 40 as well as resulting in a decrease in the boiling temperature of the primary coolant 24. The positive system pressures would, increase the possibility of primary coolant leakage while also increasing both the mechanical stresses and the boiling temperature of the primary coolant. The pressure within the system will directly affect the performance of individual circuit components 12 by increasing the overall variation in device temperatures. For example, the difference in temperature between a component operating at minimum power and a component operating at maximum power. It will be appreciated that the variations in pressire within the cooling system can be controlled by controlling the amount of quench spray 44 supplied to the spray condensing apparatus 32.

A control arrangement is shown which measures the pressure within the condenser chamber 34 by a pressure transducer 46. A signal proportional to the pressure within the chamber 34 is sent to the controller 48 which regulates the motorized flow valve 50 accordingly. The controller 48 is designed to operate around a particular pressure. With a positive pressure indication, the flow to the nozzles 30 will be increased (increasing the rate of condensation) and with a negative pressure reading, the coolant (or condensation) flow to the spray nozzles 30 will be decreased (decreasing the rate of condensation). The ideal situation is that the coolant flow will be regulated to maintain constant pressure within the cooling system. This method of controlling the rate of condensation by sensing the system pressure will allow the maintenance of any desired pressure level within the cooling system. As the individual thermal loads fluctuate with time, the pressure within the system will begin to vary. This variance will be sensed and the spray nozzle 30 will be regulated to compensate for these changing conditions. The motorized control valve 50 essentially controls a bypass 52 which runs between the quench supply line 28 and the return to the coolant heat exchanger 42. As the bypass or control valve 50 is opened, the supply to the spray nozzles 30 is proportionally diminished and vice versa.

Figure 2:
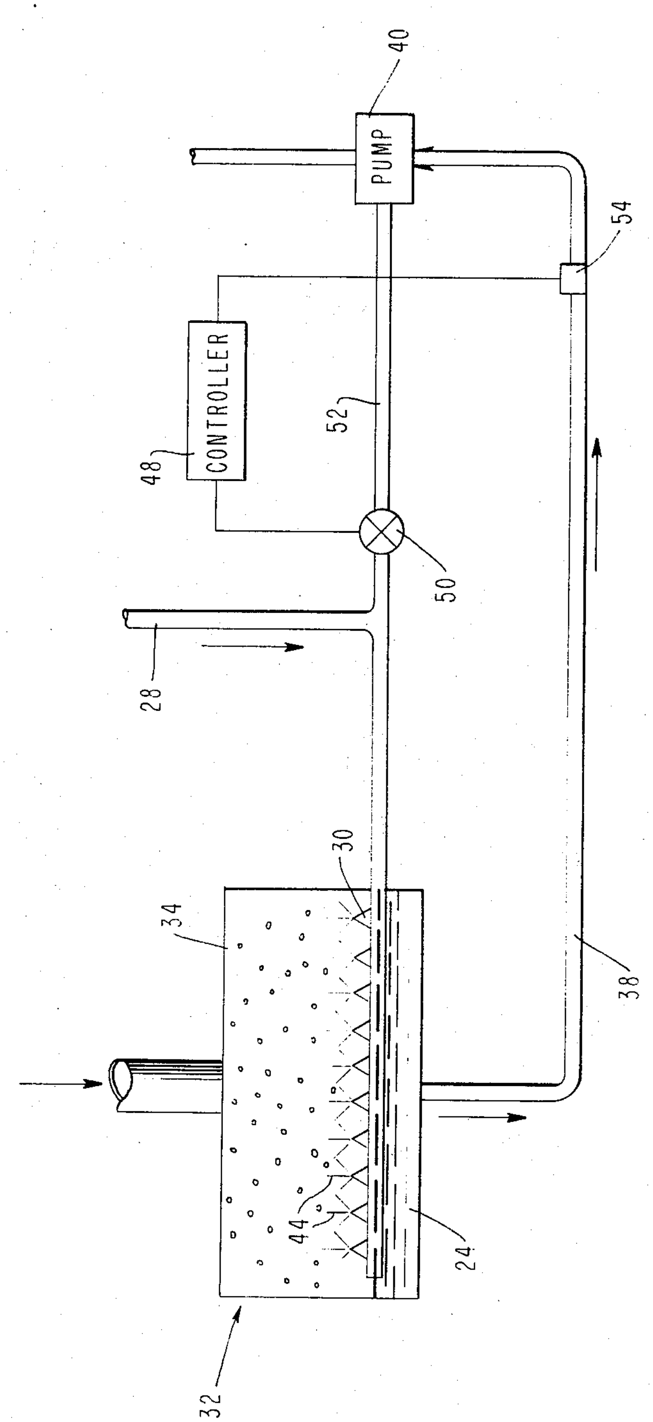
FIG. 2 is a schematic diagram of a portion of a cooling system showing a controller for controlling the amount of spray in accordance with the temperature of the coolant return from the spray condenser.

A portion of the cooling system including the spray condenser 32 and a different control arrangement are shown in FIG. 2. The input signal to the controller 48 for regulating the amount of coolant liquid supplied to the spray condensing nozzles 30 is provided by a temperature sensor 54 which measures the temperature of the liquid return from the condenser 32. An increase in the overall temperature of the return liquid 24 will indicate a greater heat flux input for a given rate of condensation. This increase in the temperature of the liquid return can be offset by an increase in the condensation which is controlled by the amount of coolant liquid supplied to the spray nozzles 30. Controlling the bypass valve 50 in accordance with temperature provides a corresponding control of the system pressure.

While the invention has been particularly shown and described with reference to a preferred embodiment thereof, it will be understood by those skilled in the art that various changes in form and detail may be made therein without departing from the spirit and scope of the invention.

What is claimed is:

1. In a liquid cooling system for data processing equipment and the like;

a heat source;

a cooling liquid, said heat source immersed in said cooling liquid so that nucleate boiling takes place within the liquid to remove heat from said heat source;

a spray condensing and cooling means for providing a spray of said cooling liquid; and conduit means connecting said heat source to said spray condensing and cooling means so that two-phase flow takes place from said heat source in the form of liquid and boiling vapors to said spray condensing and cooling means, said vapors in said two-phase flow being condensed and cooled by the cooler spray in said spray condensing and cooling means.

2. In a liquid cooling system according to claim 1, wherein said heat source and said spray condensing and cooling means are located in a closed single circulating system.

3. In a liquid cooling system according to claim 1, wherein outlet conduit means are provided connecting said spray condensing and cooling means to said heat source, and a pump located in said outlet conduit means for pumping the fluid from said spray condensing and cooling means to said heat source.

4. In a liquid cooling system according to claim 3, wherein a heat exchanger is located in said outlet conduit to further cool said fluid before it reaches said heat source.

5. In a liquid cooling system according to claim 4, wherein a quench spray conduit branches out from said outlet conduit after said pump and heat exchanger and connects to said spray condensing and cooling means to carry the cooled liquid to be sprayed.

6. In a liquid cooling system according to claim 5, wherein a bypass conduit is provided connected between said quench spray conduit and said outlet conduit for bypassing said cooling liquid so that it does not enter said spray condensing and cooling means, said control valve being located in said bypass conduit, said control valve being operated by said servo controller in response to said pressure sensing means located in said circulating system of said spray condensing and cooling means and said heat source to bypass the cooling liquid when a decrease in condensing spray is signalled by a drop in pressure within said system and to diminish the bypass flow when an increase in spray is required by a signal indicating a pressure increase in the system.

7. In a liquid cooling system according to claim 2, wherein a control means is provided for controlling the amount of spray provided by said spray condensing and cooling means.

8. In a liquid cooling system according to claim 7 wherein a pressure sensor is provided within said control means for measuring the pressure therein and a servo controller is connected to said pressure sensor for transforming said pressure signal into a valve movement for controlling the amount of said cooling liquid applied to said spray condensing and cooling means.

9. In a liquid cooling system according to claim 7, wherein a temperature sensing means is located after said spray condensing and cooling means and a servo controller is provided for transforming said temperature signal into a valve movement for controlling the amount of liquid fed to said spray condensing and cooling means increasing the flow for a temperature rise and vice versa.

* * * * *